United States Patent
Kanareykin et al.

(10) Patent No.: US 9,590,383 B1
(45) Date of Patent: Mar. 7, 2017

(54) BEAM-DRIVEN SHORT WAVELENGTH UNDULATOR

(71) Applicant: Euclid TechLabs, LLC, Gaithersburg, MD (US)

(72) Inventors: Alexei Kanareykin, Darien, IL (US); Chunguang Jing, Naperville, IL (US); Alexander Zholents, Darien, IL (US)

(73) Assignee: EUCLID TECHLABS LLC, Solon, OH (US)

( * ) Notice: Subject to any disclaimer, the term of this patent is extended or adjusted under 35 U.S.C. 154(b) by 0 days.

(21) Appl. No.: 14/176,070

(22) Filed: Feb. 8, 2014

Related U.S. Application Data

(60) Provisional application No. 61/793,447, filed on Mar. 15, 2013.

(51) Int. Cl.
*H01S 3/00* (2006.01)
*H01S 3/09* (2006.01)
*H01S 3/0955* (2006.01)
*H01S 3/0957* (2006.01)

(52) U.S. Cl.
CPC .......... *H01S 3/0903* (2013.01); *H01S 3/0955* (2013.01); *H01S 3/0957* (2013.01)

(58) Field of Classification Search
CPC ..... H01S 3/0903; H01S 3/0955; H01S 3/0957
See application file for complete search history.

(56) References Cited

U.S. PATENT DOCUMENTS

| | | | |
|---|---|---|---|
| 2006/0222147 A1* | 10/2006 | Filkins | H05G 2/00 378/119 |
| 2007/0014392 A1* | 1/2007 | Madey | H05G 2/00 378/119 |

* cited by examiner

*Primary Examiner* — Yuanda Zhang
(74) *Attorney, Agent, or Firm* — John D. Gugliotta

(57) ABSTRACT

A technique for producing a coherent beam of hard X-rays is provided. This technique is based on a short wavelength undulator that uses the fields of an electromagnetic wave to deflect a relativistic electron beam along a sinusoidal trajectory in order to cause it to emit X-rays. The undulator consists of a slow-wave structure that is energized by a second counterpropagating electron beam. Cylindrical and planar structure configurations are provided and also a mechanism for electrical and mechanical tuning to allow control over the wavelength of the emitted X-ray beam.

26 Claims, 6 Drawing Sheets

BEAM-DRIVEN SHORT WAVELENGTH UNDULATOR

RELATED APPLICATIONS

The present invention claims the benefit of U.S. Provisional Patent No. 61/793,447, filed Mar. 15, 2013 and incorporated by reference as if fully rewritten herein.

GOVERNMENT RIGHTS

None.

BACKGROUND OF THE INVENTION

1. Technical Field of the Invention

The present invention is in the technical field of insertion devices for high energy accelerator based advanced X-ray sources. In order to generate a coherent beam of X-rays from an electron beam, the beam must be periodically deflected in a plane transverse to its axial motion, usually employing a specialized magnet called an undulator. This invention is a new design for an undulator based on an electron drive beam powering a slow-wave microwave waveguide. The electromagnetic fields induced in the waveguide by the drive beam are used to introduce a periodic deflection of a second electron beam propagating through the waveguide in the direction opposite to the drive beam. The second beam then emits high power short wavelength coherent electromagnetic radiation.

It is important to emphasize that the undulator waveguide may be any type of slow-wave structure with an appropriately chosen resonant frequency. Thus the undulator may be based on metallic (normal or superconducting) structures similar to the kind used in conventional particle accelerators, including iris-loaded and corrugated wall structures. Another class of possible undulators for this application is the dielectric loaded structure, exploiting the well-developed technology of the dielectric wakefield accelerator (DWA) for generating the deflecting field using a drive beam. Extensions to the DWA concept can be used to enhance the performance of the BDU such as the addition of dielectric field concentrators to the undulator waveguide. Furthermore, through the inclusion of nonlinear dielectrics or adjustable geometric parameters to the BDU structure, the structure wavelength and hence the wavelength of the X-ray output can be varied.

The principal application of this technology is the generation of X-ray beams for basic materials research, medical therapy and diagnostic imaging.

2. Description of the Background Art

The Beam Driven Undulator (BDU) described in this present invention represents significant improvements over existing designs and concepts for high power short wavelength undulators.

Current undulator technology typically uses a static magnetic field generated by a periodic array of permanent magnets or electromagnets to introduce a periodic deflection in the path of an electron beam that causes it to emit coherent radiation. The undulator wavelength $\lambda_u$ is related to the wavelength $\lambda$ of the emitted radiation by $\lambda \sim \lambda_u/2\gamma^2$, where $\gamma = E_{beam}/mc^2$. Construction of a workable magnetic undulator becomes increasingly difficult as $\lambda_u$ is reduced below the 1 cm level required for a coherent X-ray source.

The limitations on the minimum $\lambda_u$ in a static field based undulator can be overcome by using a high frequency electromagnetic wave to create the periodic deflecting field. For example, a cavity resonator supporting a hybrid (deflecting) mode driven by a high power rf source could be used as an undulator; a corrugated metallic waveguide for this purpose has been demonstrated in the laboratory. This approach is not in current use because of the Gigawatt-level external microwave source required for its operation. The BDU presented here effectively develops a short undulator period without static deflection magnets and without an external high power microwave source by using a second counter propagating low energy electron beam to generate the requisite deflecting fields.

Further, the nature of existing undulator schemes does not permit changing the frequency of the emitted X-ray beam over a wide range of values.

Further still, in this invention a large beam aperture can be used, contrary to magnetic undulators, allowing greater beam transmission and thus a higher intensity X-ray beam to be produced.

Further still, this invention has the capability of producing both circular and plane polarized X-ray beams.

Further still, this invention allows fast dynamical control of the X-ray beam characteristics, specifically the polarization and wavelength.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The present invention is a technique for producing coherent X-ray beams from a high energy electron beam passing through a nonmagnetic undulator device consisting of a slow-wave structure. The periodic deflection force required to generate the X-rays from the primary beam is generated by the electromagnetic wave produced in the undulator structure by a second, low energy electron beam propagating in the opposite direction to the primary beam.

SUMMARY OF THE INVENTION

1. Technical Problem

The present invention (BDU) is a new type of nonmagnetic undulator for generating short wavelength coherent high power electromagnetic radiation from a high energy electron beam. This beam driven design for an undulator is based on an electron or other charged particle bunch train powering a microwave or mm-wave structure instead of the gigawatts of power from an external microwave source that would be required for a microwave undulator. The drive bunch train propagates towards the undulating beam inside a waveguide while generating a high power micro- or mm-wave wakefield. The beam driven undulator provides strong phasing between the undulating beam and the electromagnetic wakefield wave because the wakefield generated by the secondary (drive) beam propagates along the undulator waveguide with phase velocity equal to the speed of the relativistic drive beam. Appropriate waveguide design and bunch spacing of the electron drive beam train provide single mode generation of the high amplitude undulating field.

The degree of coherence of the X-ray beam that is produced is given by the undulator parameter $K = (B_0 e/m_0 c)(\lambda_u/2\pi)$, a measure of the angle of deflection of the electron beam emitting the radiation. For a coherent X-ray source or free electron laser, $K \sim 1$ is needed for a high frequency device. Controlling $\lambda_u$ is the key to achieving this condition.

This invention uses a metal or dielectric waveguide or other slow wave structure as an undulator. Use of a dielectric waveguide can exploit the well-developed technology of the dielectric wakefield accelerator for high power RF generation. Dielectric structures are also more easily made frequency-agile compared to metallic structures. Both rectangular and cylindrical geometries are considered here although more general geometries could also be used. The undulator structure can be made to have separate vacuum regions for the drive and undulating beams.

The high current low energy drive beam traverses the structure generating a high amplitude transverse monochromatic wakefield on the axis of the undulating bunch, which passes through the structure in the opposite direction. For the cylindrical case we use a HEM (hybrid electromagnetic) mode generated by the drive beam. A field concentrator based on a second dielectric waveguide coaxial with the undulator waveguide may also be incorporated.

2. Solution to Problem

Briefly described according to a broad embodiment of the present invention, this technology is used for deflecting an electron beam in a sinusoidal path, using an electromagnetic wave generated by second beam in order to cause a coherent beam of X-rays to be produced by the first beam.

Briefly described according to a broad embodiment of the present invention, geometric configurations and methods of adjusting the characteristics of the aforementioned device are provided.

3. Advantageous Effects of Invention

In accordance with a preferred embodiment, the aim of said invention is to enable the production of intense coherent X-ray beams by periodically deflecting a high energy electron beam (the undulator beam) using a second lower energy beam (drive beam).

The advantages of the present invention include, without limitation, that it is versatile, compact and can be used to form the basis for a number of devices to generate coherent beams of X-rays. The technology forms the basis for the following classes of devices:

(a) a system consisting of
  (i) a high intensity electron beam (drive beam) that creates strong electromagnetic deflecting fields by passing on a trajectory offset from the axis through
  (ii) a slow wave structure of the appropriate frequency or tunable over a range of frequencies (the beam driven undulator, BDU);
  (iii) a high energy beam (primary or undulator beam) that also passes through the BDU structure and is caused to be deflected into an approximately sinusoidal path by the electromagnetic fields generated by the drive beam thus radiating a coherent X-ray beam;
  (iv) that the primary and drive electron beams travel through the structure in opposite directions so that the effective undulator wavelength experienced by the primary beam (wavelength of the deflecting signal generated by the drive beam) is reduced to the desired level by the Lorentz contraction. The duration of the wakefield pulse is defined by the structure group velocity, usually around 0.2 c. The undulating beam sees twice the wakefield frequency $\omega_u=2\omega_y$, where $\omega_y$ is the transverse wakefield frequency in the laboratory frame. As a result of the Lorentz transformation the wavelength of the transverse deflecting field is half that of the transverse deflecting field wavelength in laboratory coordinates;
  (v) that by adjusting the transverse offset of the drive and undulator beams relative to the axis of the BDU the polarization of the X-ray beam can be controlled and modified.

b. as in item (a), where the BDU is a planar dielectric structure consisting of two parallel dielectric slabs separated by a gap to form a vacuum channel and located inside a conducting enclosure;

c. as in item (a) but using as the BDU described in item (ii) a planar dielectric structure consisting of two parallel dielectric slabs separated by a gap to form a vacuum channel and located inside a conducting enclosure containing a second dielectric slab transversely separating the drive and undulator beams to act as a field concentrator;

d. as in item (a) but using a cylindrical dielectric structure consisting of a dielectric cylinder with an axial beam channel as the BDU described in item (ii);

e. as in item (a) but using a cylindrical dielectric structure consisting of a dielectric cylinder with an axial beam channel and with a second concentric dielectric tube inserted into the beam channel that transports the primary beam and acts as a field concentrator as the BDU described in item (ii);

f. as in item (a) but using a metallic conducting structure with an axial beam channel as the BDU described in item (ii);

g. as in item (a) but as the BDU described in item (ii) using a planar dielectric structure consisting of two dielectric slabs separated by an adjustable beam gap to control the resonant frequency of the BDU thus allowing the wavelength of the deflecting field to be controlled in order to vary the wavelength of the emitted X-ray beam;

h. as in item (a) but as the BDU described in item (ii) using a planar dielectric structure consisting of two dielectric slabs separated by a beam gap and incorporating slabs of a nonlinear ferroelectric material. The wavelength of the BDU (and hence the wavelength of the emitted X-ray beam) is controlled by changing the permittivity of the ferroelectric layer either by adjusting the temperature and/or a dc electric potential difference applied across the ferroelectric layer;

i. as in item (a) but as the BDU described in item (ii) using a cylindrical cavity consisting of a dielectric cylinder with an axial beam channel incorporating a layer of a nonlinear ferroelectric material. The wavelength of the BDU (and hence the wavelength of the emitted X-ray beam) is controlled by changing the permittivity of the ferroelectric layer either by adjusting the temperature and/or a dc electric potential difference applied across the ferroelectric layer;

j. the BDU as in item (f) but incorporating a dielectric field concentrator as in item (b);

k. the BDU as in item (g) but incorporating a dielectric field concentrator as in item (b);

l. the BDU as in item (h) but incorporating a dielectric field concentrator as in item (d);

m. the BDU as in item (a) but consisting of a slow-wave waveguide that is specially tapered along its length so as to match the phase velocity of at least one of its EM modes to the changing velocity of a sub-relativistic particle drive beam travelling along the main axis of the structure and thus permit the use of a drive beam consisting of charged particles heavier then electrons (protons, ions).
n. When the tapering of the BDU as in item (m) is realized in the form of a tapered dielectric loaded waveguide as in items (b-e, g-l).
o. When the tapering concept is applied to a tunable BDU (items g-l) in a manner such that the frequency control elements are segmented and independently adjustable along the length of the BDU and thus provide a method for matching the phase velocity of the EM wave in the structure to the beam velocity for beams of different characteristics.
p. When the tapering of the BDU as in item (m) is realized in the form of a tapered all-metal corrugated waveguide as in item (f).
q. When the geometry of the all-metal corrugated waveguide BDU (f) is of a circular, elliptical, rectangular, parallel plate, or any other cross sectional form.
r. When the BDU (f) consists of a contiguous set of connected or combined all-metal corrugated waveguides that individually may have circular, elliptical, rectangular, parallel plate geometries or any other cross sectional form.
s. When the geometry of the dielectric BDU (items b-e, g-l, n-o) is of a circular, elliptical, rectangular, parallel plate, or any other cross sectional form.
t. When the BDU (s) consists of a contiguous set of connected or combined dielectric loaded waveguides from the set of circular, elliptical, rectangular, parallel plate or any other cross sectional form of dielectric waveguide.
u. In accordance with a preferred embodiment, the aim of said invention is to enable the devices described in points a-t above.

The advantages of the present invention include, without limitation, that it is able to generate a coherent beam of X-rays that is adjustable in wavelength and that can be done reliably and inexpensively. The use of a secondary electron beam to produce the necessary deflection of the undulator beam trajectory eliminates the need for an external variable frequency power source for the deflecting cavity.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
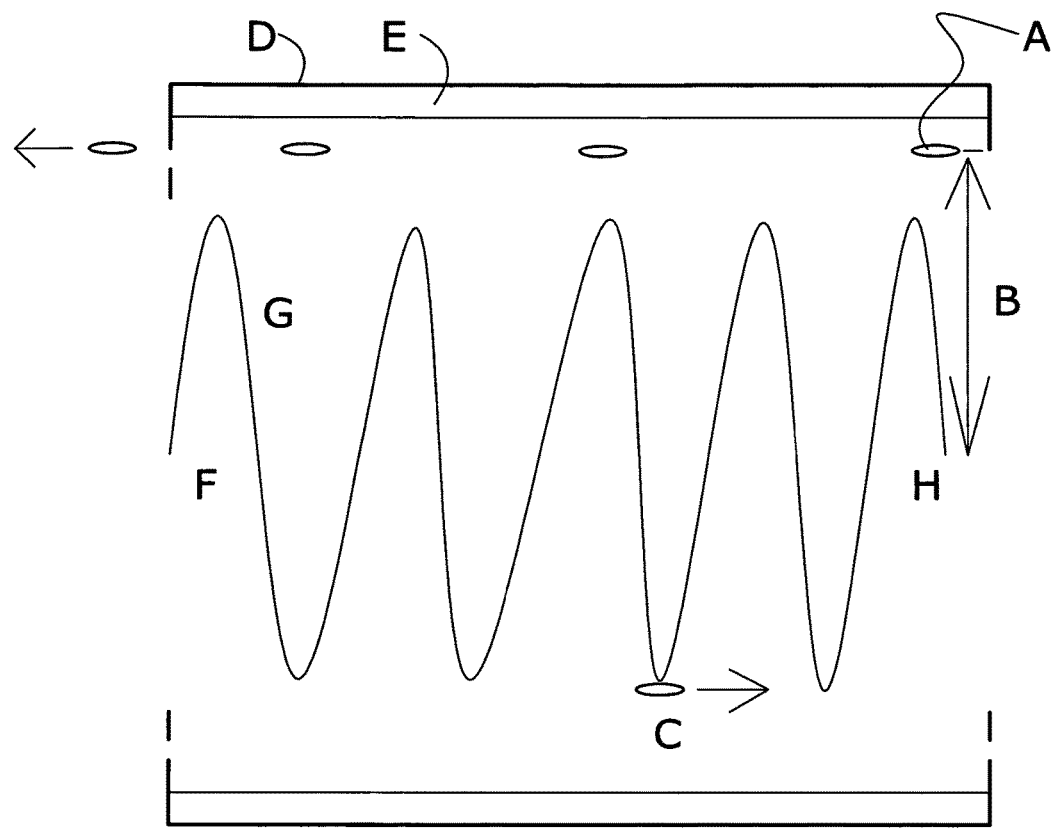
FIG. 1 is a diagram showing in a schematic fashion the principles of a coherent X-ray source based on the beam driven undulator concept according to an exemplary embodiment of the present invention.

A wakefield is the electromagnetic wave emitted by a charged particle passing through a resonant structure. The radiation is emitted via the Cherenkov effect (in the case of dielectric loaded cavities), or by the oscillating electric currents induced in a conducting metallic cavity of nonuniform beam channel aperture. In either case the radiation couples to the resonant modes of the cavity. In the case of a charged particle bunch the wakefields of the particles add collectively. Particles passing through the structure will experience different retarding or accelerating forces depending on their relative positions. The magnitude and sign of the force on a given particle depends on a number of factors: the total charge of the driving bunch; the axial distribution of particles; and the mode structure of the cavity.

We have developed a design for a short wavelength undulator that makes use of the wakefield principle, which we will refer to as the "beam driven undulator". This device is based on an electron beam powering a microwave or mm-wave waveguide. The deflecting forces generated by the drive beam's wakefields replace the precise array of high field magnets required for a static undulator, or the gigawatt level external power required for a microwave-type undulator. A beam driven undulator for a coherent X-ray source would require a 60-80 MeV, 20-60 nC electron bunch train from a linac with the individual bunch lengths in the 1-2 mm range, easily available using present technologies.

A beam driven undulator possesses all the advantages of wakefield accelerators: no complicated high power RF coupling form the source to the BDU is required, and microwave or mm-wave wakefield structures can sustain much higher fields because of the relatively short RF pulse generated by the drive beam. This allows the use of dielectric based waveguides or nonuniform all-metal structures exploiting the technology of the dielectric wakefield accelerator (DWA) for high power high frequency RF generation directly in the BDU structure. It should be noted that a dielectric loaded structure is a 2D waveguide and it does not exhibit any parameter variation along the structure length compared to an all-metal disk loaded or corrugated waveguide that requires precise machining tolerances resulting in high costs for all-metal devices.

The drive beam that generates the high power RF propagates towards the undulating beam inside a dielectric loaded waveguide. Two types of dielectric loaded waveguide geometries (rectangular and cylindrical) are presented here.

In order to accomplish the teachings and benefits of the present disclosure, an appropriate design methodology for the BDU needed to be developed. Because of the previously mentioned complex dependence of the design on beam and structure parameters, simulation software was developed to model the entire process of the particle beams passing through rectangular or cylindrical dielectric or metallic cavities. Analytic solutions to Maxwell's equations were obtained for both geometries. The code then evaluates the analytic expressions for the forces and uses these numerical results to advance a group of macroparticles with the desired initial spatial and energy distribution through the BDU geometry being evaluated.

An important feature of the dielectric BDU is the capability to adjust the parameters of the cavity to optimize its performance. This is made possible through adjusting the effective permittivity of the dielectric by incorporating temperature or electric-field sensitive ferroelectric layers into it. Additionally, the planar geometry also permits the option of adjusting the cavity by mechanically changing the aperture of its beam channel.

Referring to FIG. 1, a diagram of the BDU concept is shown. The relativistic drive bunch train (A) passes through slow-wave structure (D) at a transverse offset (B) from the structure axis (F). The structure (D) contains modifications or additions to its interior in the form of irises, corrugations, dielectric inserts etc. (E) which cause the drive beam (A) to generate electromagnetic radiation via the Cherenkov effect in the form of a transverse deflecting wakefield, which propagates towards the undulating beam (C). The undulating beam (C) is deflected from its nominal path (F) by the wakefield of the drive beam into an oscillatory path (G). X-rays are emitted from the undulator beam (C) through the synchrotron radiation mechanism and exit the BDU device through the aperture (H). The polarization state of the X-ray beam can be altered by changing the plane of the beam offset (B).

Figure 2:
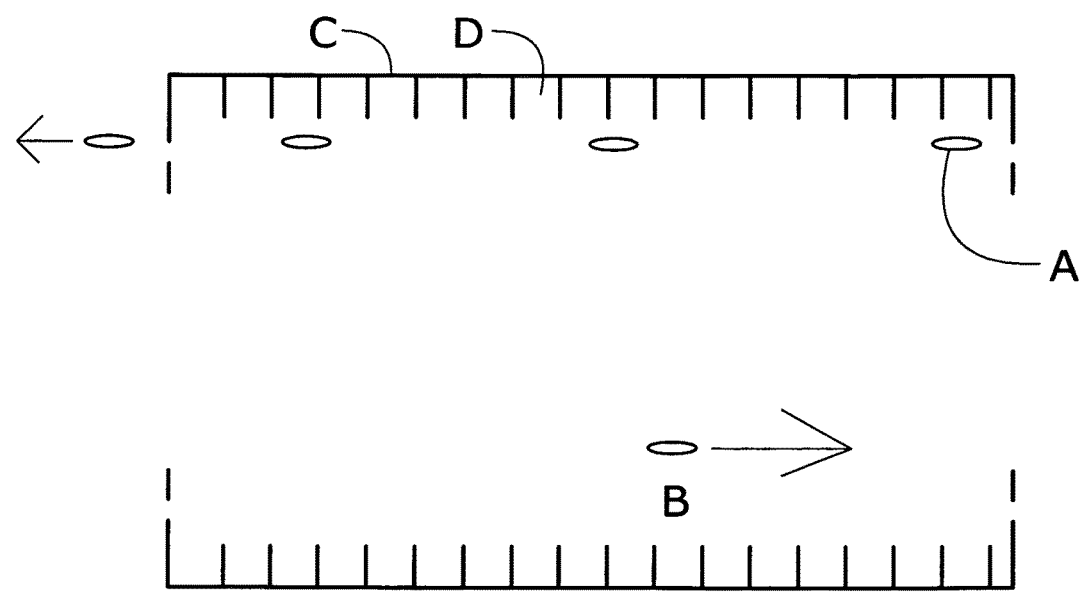
FIG. 2 is a diagram of a BDU based on a metallic structure according to a first preferred embodiment of the present invention.

Referring to FIG. 2 a specific instantiation of an all metal BDU is shown. The drive (A) and undulator (B) beams counter propagate in a structure (C) made of copper or other conducting metal. The interior of the structure contains a periodic array of vanes, corrugations or irises (D). The deflecting field for the undulator beam is generated by the image currents of the drive beam in the vanes.

Figure 3:
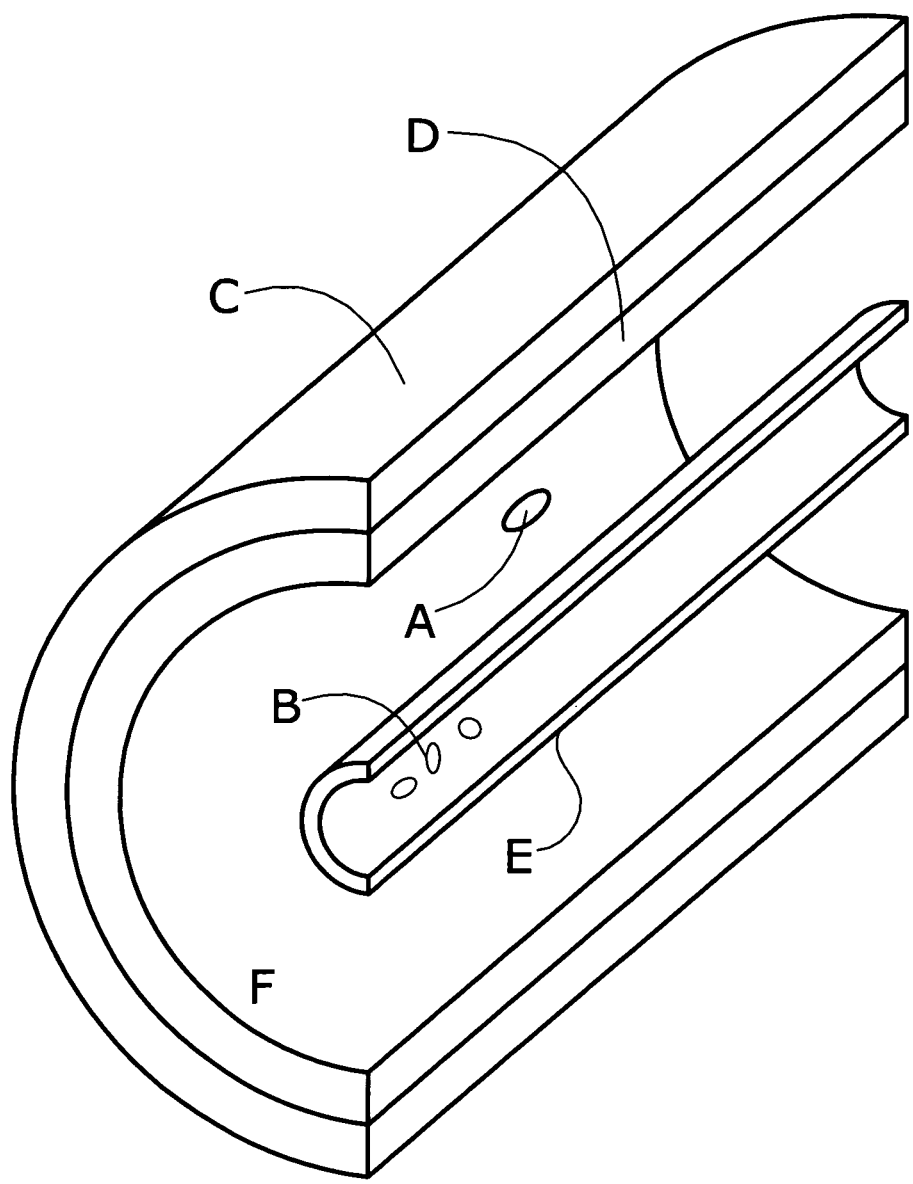
FIG. 3 is a diagram of a planar dielectric BDU according to a second preferred embodiment of the present invention showing the relative positions of the drive and primary beams and the optional field concentrator.

Referring to FIG. 3, cylindrical geometry dielectric BDU is shown. The drive beam (A) and the undulator beam (B) travel through a length of waveguide with a conducting outer sleeve (C) and a dielectric inner sleeve (D). An optional dielectric field concentrator (E) may also be used to improve the performance of the device.

Figure 4:
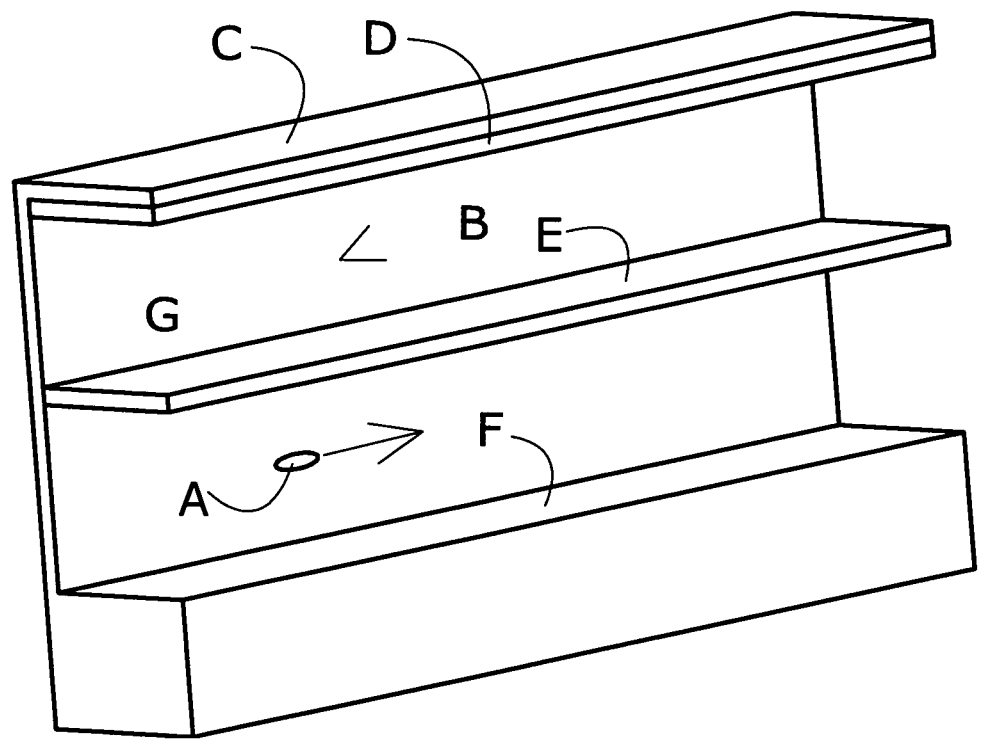
FIG. 4 is a diagram of a cylindrical dielectric BDU according to a third preferred embodiment of the present invention showing an optional dielectric tube used as a field concentrator.

Referring to FIG. 4, a specific instantiation of a planar geometry dielectric BDU is shown. The drive beam (A) and the undulator beam (B) travel through a length of waveguide with a conducting outer jacket (C) and dielectric inner layers (D, F). An optional dielectric field concentrator (E) may also be used to improve the performance of the device.

Figure 5:
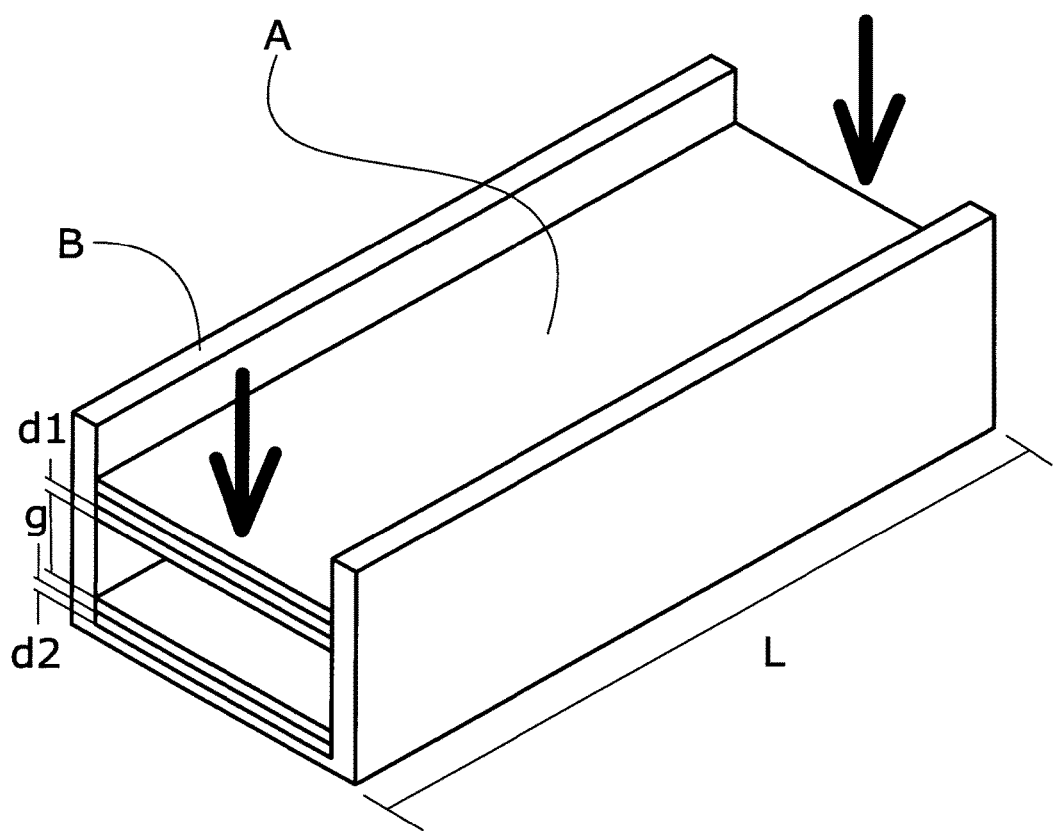
FIG. 5 is a diagram of a planar dielectric BDU according to a fourth preferred embodiment of the present invention and showing the mechanisms for frequency adjustments based on varying the vacuum gap size and on modifying the permittivity of an added nonlinear dielectric layer.

Referring to FIG. 5, a frequency-agile planar dielectric BDU consists of two counter propagating beams in a planar dielectric channel as shown in FIG. 1 and FIG. 4. A movable conducting wall (A) fitted to move inside a rectangular conducting channel (B) of length L. Mounted in the channel and movable wall are parallel dielectric (d1) and ferroelectric (d2) slabs running the length of the channel. The drive and undulator beams travel in opposite directions relative to the structure axis down the adjustable gap (g) between the dielectric slabs. The interior ferroelectric slabs (d2) are optional but can be used as an additional means of tuning the structure. The permittivity of the ferroelectric is a function of the temperature, so the wakefield frequency spectrum of the structure can be changed by external thermal control of the cavity. A DC electric field across the ferroelectric slabs can be applied using electrodes thinner than the skin depth over the range of wakefield frequencies present to adjust the permittivity and hence tune the structure.

Figure 6:
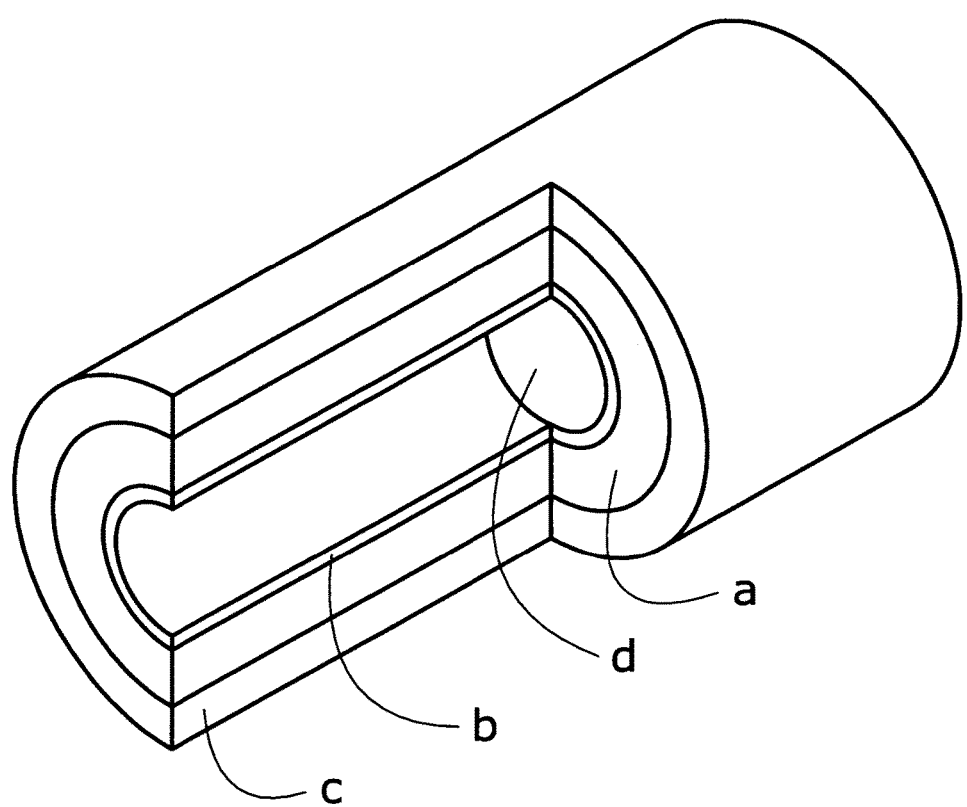
FIG. 6 is a diagram of a cylindrical dielectric BDU showing the mechanisms for frequency adjustments based on modifying the permittivity of an added nonlinear dielectric layer.

Next, referring to FIG. 6, a diagram of a cylindrical geometry energy BDU structure is shown. Concentric dielectric cylinders (a,b) are inserted into a conducting sleeve (c). A cylindrical beam channel (d) is located on axis. Since in this geometry there is no method to conveniently tune the structure by adjusting the gap, a layer of ferroelectric (a) is present to permit either thermal or electrical tuning as in the aforementioned planar geometry of FIG. 5.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

Having thus described the invention what is claimed as new and desired to be Secured by Letters Patent is as follows:

1. A nonmagnetic undulator for generating short wavelength coherent high power electromagnetic radiation from a high energy electron beam without the use of periodic static magnetic fields comprising:
   a first charged particle beam;
   a slow-wave cavity structure that generates a transverse deflecting field from said first charged particle beam passing there through by means of a wakefield induced in the structure by the beam;
   a second charge particle beam counter propagating to said first charged particle beam;
   wherein said transverse deflecting field imparts a transverse oscillation to said second counter propagating beam that causes emission of synchrotron radiation in the form of coherent X-ray beam.

2. A nonmagnetic undulator for generating short wavelength coherent high power electromagnetic radiation from a high energy electron beam without the use of periodic static magnetic fields comprising:
   a first charged particle beam;
   a slow-wave cavity structure that generates a transverse deflecting field from said first charged particle beam passing there through by means of a wakefield induced in the structure by the beam;
   a second charge particle beam counter propagating to said first charged particle beam;
   wherein said transverse deflecting field imparts a transverse oscillation to said second counter propagating beam that causes emission of synchrotron radiation in the form of coherent X-ray beam;
   wherein a polarization of said coherent X-ray beam can be altered by changing a plane of offset between said first charged particle beam and said second charged particle beam.

3. A nonmagnetic undulator for generating short wavelength coherent high power electromagnetic radiation from a high energy electron beam without the use of periodic static magnetic fields comprising:
   a first charged particle beam;
   a slow-wave cavity structure that generates a transverse deflecting field from said first charged particle beam passing there through by means of a wakefield induced in the structure by the beam;
   a second charge particle beam counter propagating to said first charged particle beam;

wherein said transverse deflecting field imparts a transverse oscillation to said second counter propagating beam that causes emission of synchrotron radiation in the form of coherent X-ray beam; and a planar geometry dielectric structure that is tuned to produce a variable wavelength X-ray beam by changing a period of a beam oscillation induced by the cavity.

4. The nonmagnetic undulator of claim 3, further comprising a mechanism of tuning selected from the group consisting of: altering the beam channel aperture in the structure; incorporation of a thin ferroelectric layer into the dielectric structure to electrically control an effective permittivity of the structure; incorporation of a thin ferroelectric layer into the dielectric structure to thermally control the effective permittivity of the structure; and a combination of more than one said group member.

5. A beam driven undulator for generating coherent short wavelength radiation comprising:

a slow-wave cavity structure having an interior periodic array of oscillation inducing structures offset from an axis and forming an aperture;

a source for generating a first electron beam directed through said cavity structure at a transverse offset from said axis, said first beam capable of generating a transverse deflecting wakefield by image currents of said first electron beam in said oscillation inducing structures;

a source for generating a second electron beam in a counter-propagating direction from said first beam, said second beam being deflected into an oscillatory path induced by said wakefield without the use of periodic static magnetic fields;

wherein a coherent beam of hard X-rays is produced by said second electron beam and emitted through said aperture.

6. The beam driven undulator of claim 5, wherein a polarization state of the X-ray beam can be altered by changing a plane of said transverse offset.

7. The beam driven undulator of claim 6, wherein said slow-wave cavity structure is made of a conductive metal.

8. The beam driven undulator of claim 5, wherein said oscillation inducing structures are selected from the group consisting of: vanes; corrugations and irises.

9. The beam driven undulator of claim 6, wherein said slow-wave cavity structure is made in a cylindrical geometry comprising waveguide having a conducting outer sleeve and a dielectric inner sleeve.

10. The beam driven undulator of claim 9, further comprising a dielectric field concentrator aligned with said axis.

11. The beam driven undulator of claim 6, wherein said slow-wave cavity structure is made in a planar geometry comprising a waveguide having a conducting outer jacket and a pair of dielectric inner layers.

12. The beam driven undulator of claim 11, further comprising a dielectric field concentrator aligned with said axis.

13. A method for producing a coherent beam of hard X-rays comprising:

a. passing a first charged particle beam (the drive beam) off axis through a slow-wave cavity structure;

b. generating a transverse deflecting wakefield within said slow-wave structure by energizing said slow-wave cavity structure with said first charged particle beam; and c. passing a second counterpropagating charged particle beam (the undulator beam) through the transverse deflecting field in the said energized slow-wave structure, said second counterpropagating charged particle beam being oriented 180 degrees with respect to the direction of said first charged particle beam;

wherein a short wavelength undulation of said second charged particle beam is induced by passing through said transverse wakefield, and thereby causing the second beam to move along a sinusoidal trajectory such that X-rays are emitted coherently.

14. The method for producing a coherent beam of hard X-rays of claim 13, wherein said slow-wave cavity structure comprises a cylindrical structure configuration.

15. The method of producing a coherent beam of hard X-rays of claim 14, wherein said cylindrical structure configuration comprises:

a metallic conducting cylinder; and a beam channel axially disposed within said metallic conducting cylinder.

16. The method of producing a coherent beam of hard X-rays of claim 14, wherein said cylindrical structure configuration comprises:

a dielectric cylinder; and a beam channel axially disposed within said dielectric cylinder.

17. The method of producing a coherent beam of hard X-rays of claim 16, further comprising a second concentric dielectric tube inserted into said beam channel that transports the first charged particle beam and thereby functions as a field concentrator.

18. The method for producing a coherent beam of hard X-rays of claim 13, wherein said slow-wave cavity structure comprises a planar structure configuration.

19. The method for producing a coherent beam of hard X-rays of claim 18, wherein said planar structure configuration comprises:

a conducting enclosure; and two parallel dielectric slabs separated by a gap to form a vacuum channel located inside said conducting enclosure.

20. The method for producing a coherent beam of hard X-rays of claim 19, wherein said planar structure configuration further comprises a second dielectric slab transversely separating said first charged particle beam from said second charged particle beam.

21. The method for producing a coherent beam of hard X-rays of claim 19, wherein said gap is adjustable to control a resonant frequency of the cavity and thereby allow a wavelength of the deflecting field to be controlled in order to vary the wavelength of the emitted X-ray beam.

22. The method for producing a coherent beam of hard X-rays of claim 20, further comprising slabs of a nonlinear ferroelectric material;

wherein a wavelength of the emitted X-ray beam is controlled by changing the permittivity of the ferroelectric layer by adjusting temperature and/or adjusting a DC electric potential difference applied across the ferroelectric layer.

23. A beam driven undulator for generating coherent short wavelength radiation comprising:

a dielectric channel having parallel dielectric and ferroelectric slabs running along a first length of said channel;

a movable conducting wall fitted to move inside said channel and having parallel dielectric and ferroelectric slabs running along a second length of said wall;

an adjustable gap formed between said the dielectric channel and the conducting wall;

a charged particle drive beam and a counter propagating charged particle undulator beam travelling in opposite directions relative to a linear channel axis;

said undulator beam being deflected into an oscillatory path induced by a wakefield formed without the use of periodic static magnetic fields;

wherein a coherent beam of hard X-rays is produced by said charge particle drive beam as it counter propagates through said wakefield.

24. The beam driven undulator for generating coherent short wavelength radiation of claim 23, wherein adjustment of said gap tunes the frequency of said X-rays.

25. The beam driven undulator for generating coherent short wavelength radiation of claim 23, further comprising temperature control for changing a wakefield frequency.

26. The beam driven undulator for generating coherent short wavelength radiation of claim 23, further comprising a DC electric field applied across the ferroelectric slabs using electrodes thinner than the skin depth over the range of wakefield frequencies for adjusting permittivity.

* * * * *

UNITED STATES PATENT AND TRADEMARK OFFICE
CERTIFICATE OF CORRECTION

PATENT NO. : 9,590,383 B1
APPLICATION NO. : 14/176070
DATED : March 7, 2017
INVENTOR(S) : Alexei Kanareykin, Chunguang Jing and Alexander Zholents It is certified that error appears in the above-identified patent and that said Letters Patent is hereby corrected as shown below:

In the Specification

In Column 1, Line 12 after the heading "GOVERNMENT RIGHTS," replace the word "None." with the following text:
This invention was made with government support under DE-SC0004322 awarded by the U. S. Department of Energy. The Government has certain rights in the invention.

Signed and Sealed this
Third Day of October, 2023

Katherine Kelly Vidal
*Director of the United States Patent and Trademark Office*